US009505330B2

(12) United States Patent
Hirtenlehner et al.

(10) Patent No.: US 9,505,330 B2
(45) Date of Patent: Nov. 29, 2016

(54) ENTRY AID WITH THREE-POINT BEARING FOR A RAIL VEHICLE OR A MOTOR VEHICLE

(71) Applicant: KNORR-BREMSE GESELLSCHAFT MIT BESCHRÄNKTER HAFTUNG, Mödling (AT)

(72) Inventors: Andreas Hirtenlehner, Öhling (AT); Johann Wilflinger, Linz (AT)

(73) Assignee: KNORR-BREMSE GESELLSCHAFT MIT BESCHRÄNKTER HAFTUNG, Mödling (AT)

( * ) Notice: Subject to any disclaimer, the term of this patent is extended or adjusted under 35 U.S.C. 154(b) by 0 days.

(21) Appl. No.: 14/760,318

(22) PCT Filed: Jan. 13, 2014

(86) PCT No.: PCT/AT2014/050007
§ 371 (c)(1),
(2) Date: Jul. 10, 2015

(87) PCT Pub. No.: WO2014/107756
PCT Pub. Date: Jul. 17, 2014

(65) Prior Publication Data
US 2015/0352992 A1 Dec. 10, 2015

(30) Foreign Application Priority Data
Jan. 14, 2013 (AT) .................. 50015/2013

(51) Int. Cl.
*B62J 25/00* (2006.01)
*B60N 3/06* (2006.01)
(Continued)

(52) U.S. Cl.
CPC ................ *B60N 3/063* (2013.01); *B60R 3/02* (2013.01); *B61D 23/025* (2013.01)

(58) Field of Classification Search
CPC ........ B60N 3/063; B60R 3/02; B61D 23/025
See application file for complete search history.

(56) References Cited

U.S. PATENT DOCUMENTS

| 3,341,223 A | 9/1967 | Wampfler |
| 5,357,869 A | 10/1994 | Barjolle et al. |

(Continued)

FOREIGN PATENT DOCUMENTS

| CN | 101522502 A | 9/2009 |
| CN | 101722961 A | 6/2010 |

(Continued)

OTHER PUBLICATIONS

Search Report for Austrian Patent Application No. A 50015/2013; Jan. 14, 2013.

(Continued)

*Primary Examiner* — Tony Winner
*Assistant Examiner* — Marlon A Arce
(74) *Attorney, Agent, or Firm* — Barnes & Thornburg LLP (57) ABSTRACT

An entry aid for a rail vehicle or a motor vehicle have a step, which is movably supported on rolling elements and/or sliding surfaces, and a drive, which is coupled to the step for extending and retracting the step. The rolling elements/sliding surfaces are positioned in exactly three support regions at a distance from one another and arranged in a triangle. Alternatively the rolling elements/sliding surfaces can be arranged on rockers, and bearing points of the rockers can be positioned in exactly three support regions at a distance from one another and arranged in a triangle.

11 Claims, 4 Drawing Sheets

(51) Int. Cl.
*B61D 23/02* (2006.01)
*B60R 3/02* (2006.01)

(56) References Cited

U.S. PATENT DOCUMENTS

| | | | | |
|---|---|---|---|---|
| 5,775,232 | A * | 7/1998 | Golemis | B61D 23/025 105/458 |
| 6,167,816 | B1 * | 1/2001 | Lavery | B61D 23/025 105/458 |
| 6,203,265 | B1 * | 3/2001 | Cohn | A61G 3/061 414/537 |
| 6,860,701 | B2 * | 3/2005 | Kiser | A61G 3/061 414/522 |
| 7,052,227 | B2 * | 5/2006 | Navarro | B60P 1/431 414/537 |
| 7,516,703 | B2 * | 4/2009 | Tazreiter | B60R 3/02 105/443 |
| 7,870,630 | B2 * | 1/2011 | Johnson | A61G 3/061 14/71.1 |
| 7,971,891 | B2 * | 7/2011 | Kircher | A61G 3/061 280/163 |
| 8,020,496 | B1 * | 9/2011 | Maysonet | B61B 1/00 105/425 |

FOREIGN PATENT DOCUMENTS

| | | |
|---|---|---|
| DE | 19928571 A1 | 1/2001 |
| DE | 202008004517 U1 | 8/2009 |
| DE | 202008004592 U1 | 8/2009 |
| DE | 202009004004 U1 | 8/2010 |
| DE | 202009005045 U1 | 9/2010 |
| EP | 0578574 A1 | 1/1994 |
| EP | 2243679 A2 | 10/2010 |

OTHER PUBLICATIONS

Search Report for International Patent Application No. PCT/AT2014/050007; Jun. 23, 2014.
Chinese Office Action for Chinese Application No. 201480004761.2 date Jul. 6, 2016.

* cited by examiner

ENTRY AID WITH THREE-POINT BEARING FOR A RAIL VEHICLE OR A MOTOR VEHICLE

PRIORITY CLAIM

This patent application is a U.S. National Phase of International Patent Application No. PCT/AT2014/050007, filed 13 Jan. 2014, which claims priority to Austrian Patent Application No. A 50015/2013, filed 14 Jan. 2013, the disclosures of which are incorporated herein by reference in their entirety.

FIELD

Disclosed embodiments relate to an entry aid for a rail vehicle or a motor vehicle, comprising a footboard which is mounted displaceably on rolling bodies and/or sliding surfaces, and a drive which is coupled to the footboard and is designed for extending and retracting the footboard.

BRIEF DESCRIPTION OF THE FIGURES

Disclosed embodiments are explained in more detail with reference to the figures below, in which.

DETAILED DESCRIPTION OF THE DISCLOSED EMBODIMENTS

Within the context of the disclosed embodiments, when the phrase "support regions which are spaced apart from one another" with a plurality of rolling bodies/sliding surfaces in each case is used, it should be understood that the rolling bodies/sliding surfaces of a support region form a clearly identifiable group or a clearly identifiable "cluster". That is to say, the distance of the individual rolling bodies/sliding surfaces of one support region with respect to one another is small in comparison to the distance of the rolling bodies/sliding surfaces of two different support regions.

The support regions or clusters which are spaced apart from one another can also be related to (momentum-free) force introduction points of a plurality of rolling bodies/sliding surfaces. For example, two rolling bodies/sliding surfaces can be connected via a rocker firstly to distribute a loading over a plurality of rolling bodies/sliding surfaces, but secondly also to ensure that the rolling bodies/sliding surfaces always provide support. Essentially only a bearing force, but no torque can be transmitted via the rotary bearing of the rocker. Such force introduction points or bearing points can likewise be arranged in the triangle or can also form clusters. The mounting of the footboard itself is still substantially determined statically here even if the rolling bodies/sliding surfaces and/or sliding surfaces themselves do not form any clusters, but the force introduction points or bearing points have this property.

Optionally, the distance of two support regions from each other may be at least five times the size of the maximum extension thereof. As a result, the mounting of the footboard is substantially statically determined since the support regions are small in comparison to the distance therebetween. For example, the distance of two support regions can be related to the center distance thereof or to the distance of the area centers of gravity thereof and to the (smallest) edge distance thereof.

Optionally, one rolling body or one sliding surface or one bearing point may be provided per support region. That is to say, the number of rolling bodies/sliding surfaces/bearing points may be precisely three. The static determination of the footboard mounting is therefore particularly good.

Optionally, all of the support regions may be spaced apart from one another with respect to a direction transversally with respect to a direction of movement of the footboard. Each support region is therefore assigned a dedicated rail. In this disclosed embodiment, the security against tilting is therefore particularly great. However, it is also conceivable for the support regions to be assigned to two rails or else to only one rail.

Disclosed embodiments provide a first and a second support region which lie closer to the footboard than the third support region, as seen in a direction of movement of the footboard, wherein the first and the second support region are at an equal distance from the footboard, as seen in a direction of movement of the footboard. In this disclosed embodiment, two support regions are therefore located close to the footboard, in particular close to the side edges thereof. A third support region is located somewhat further away from the footboard and is arranged with respect to the width of the footboard, optionally in the center thereof. This results in substantially symmetrical conditions. Under the prerequisite that the footboard is loaded centrally, which constitutes the general situation, and under the prerequisite that the third support region is at an equal distance as the center of the footboard from the first/second support region with respect to a direction of movement of the footboard, forces of equal magnitude which correspond to the loading and the footboard act in the first to third support regions. In the first and second support regions, the forces mentioned act upward, whereas the force in the third support region acts downward. As a result, use can be made of three identical rolling bodies/sliding surfaces which, owing to the symmetrical loading thereof, also have substantially the same service life. Depending on how greatly the construction differs from this symmetry, other force ratios correspondingly arise. A different number of rolling bodies/sliding surfaces or rolling bodies/sliding surfaces which differ in terms of type can then optionally also be used in the individual support regions.

One or more from the group consisting of a ball, roller, needle and/or barrel may be provided as the rolling bodies. Different rolling bodies can be used depending on the intended use. For example, rollers and barrels can absorb comparatively high forces. Furthermore, a barrel mounting can readily compensate for angle errors. Angle errors are also readily compensated for if balls are used as the rolling bodies. Balls are also especially suitable if the running surface is not configured horizontally, but is placed somewhat obliquely, to improve the lateral guidance of the footboard. The resulting bearing force is then not oriented vertically, but simply obliquely. Needles are finally suitable in particular for installation situations in which a low overall height is important.

Disclosed embodiments of the entry aid may comprise a force sensor which is designed for measuring the bearing force acting in a support region. The loading acting on the footboard can thereby be determined. For example, with the data obtained in this manner, conclusions can be drawn as to who or what precisely is located on the footboard. If the magnitude of the force is, for example, above 500N, it can be assumed with a high degree of probability that an adult is located on the footboard. If the loading is variable, then in all probability a living organism (human or animal) is located on the footboard, and if the loading is static for a prolonged period, it is certainly probable that merely an item of luggage is deposited on the footboard.

Optionally, the entry aid comprises three force sensors which may be designed for measuring the bearing forces acting in all three support regions. In this manner, first of all the magnitude of the force acting (vertically) on the footboard and the engagement point of the force on the footboard can be calculated.

Optionally, the entry aid may comprise two force sensors which are designed for measuring the bearing forces acting in two support regions, in particular for measuring the bearing forces acting in the first support region and in the second support region. In this manner, firstly, the magnitude of the force acting (vertically) on the footboard and the engagement point of the force on the footboard can be calculated if a co-ordinate of the engagement point is presumed or assumed to be known. For example, the engagement point mentioned can be assumed in a good approximation with respect to the depth of the footboard in the center of the depth.

Furthermore, the entry aid may comprise precisely one force sensor which is designed for measuring the bearing force acting in precisely one support region, in particular for measuring the bearing force acting in the third support region. The magnitude of the force acting on the footboard can thereby be calculated if the engagement point of the force is presumed or assumed to be known. For example, the engagement point mentioned can be assumed in a good approximation in the center of the footboard. If the force sensor is provided in the third support region, knowledge of the co-ordinate of the engagement point of the force in the direction of movement of the footboard is sufficient. For example, the engagement point mentioned can be assumed in a good approximation with respect to the depth of the footboard in the center of the footboard. Of course, other engagement points can also be assumed with respect to the depth of the footboard, for example the front edge or else rear edge thereof.

Optionally, the rolling bodies/sliding surfaces provided in a support region may be mounted movably, in particular resiliently, with respect to one another with respect to a direction transversally with respect to the bearing surface of the rolling bodies/sliding surfaces. Tolerances of the entry aid can thereby be compensated for in the respect that the rolling bodies/sliding surfaces of a support region also have (all) contact with a bearing surface and rolling surface and do not "hang in the air". It is thereby avoided that the force acting in a support region is not inadvertently absorbed only by a part of the rolling bodies/sliding surfaces located in the support region and therefore the rolling bodies/sliding surfaces are excessively loaded. In particular, the path along which the rolling bodies/sliding surfaces can be moved runs at an angular range of +/−45° from the normal to the bearing surface mentioned. Specifically, the path can run in an arcuate manner or else rectilinearly (and in particular normally to the bearing surface).

However, the rolling bodies/sliding surfaces provided in a support region may be mounted rigidly with respect to one another with respect to a direction transversely with respect to the bearing surface of the rolling bodies/sliding surfaces. This results in a simple and less error-prone construction of the entry aid.

Furthermore, the support regions may be mounted movably, in particular resiliently, with respect to one another with respect to a direction transversally with respect to the bearing surface thereof. The effect achieved by this, for example, is that, even despite tolerances which lead to inadvertent height deviations of the support regions, the footboard can be oriented horizontally. The path along which the support regions can be moved can also run here in particular at an angular range of +/−45 from the normal to the bearing surface mentioned. Specifically, the path can run in an arcuate manner or also rectilinearly (and in particular normally to the bearing surface).

However, the support regions may be mounted rigidly with respect with respect to one another with respect to a direction transversally with respect to the bearing surface thereof. This in turn results in a simple and less error-prone construction of the entry aid.

Furthermore, at least one rolling body/at least one sliding surface may be mounted resiliently with the aid of a spring, and the entry aid may comprise a stop which is effective after a predeterminable spring deflection of the spring on the far side of the at least one rolling body/of the at least one sliding surface and of the spring. As a result, the loading of the rolling body/of the sliding surface is limited to that force which is defined by the spring constant of the spring and the spring deflection, at which the stop becomes effective. By contrast, a loading of the rolling body/of the sliding surface going there beyond is avoided since the loading is absorbed by the stop mentioned. Therefore, the stop arranged in "on the far side of the rolling body/of the sliding surface and of the spring" differs from a stop which acts on the rolling body/the sliding surface or the spring mechanism. Although a further inward deflection of the rolling body/of the sliding surface is also prevented here, an additionally acting force is supported by the rolling body/by the sliding surface itself.

The force sensor may be designed for measuring the bearing force acting on at least one rolling body/at least one sliding surface. In this disclosed embodiment, the force acting on the at least one rolling body/the at least one sliding surface is measured directly, for example with a piezo pressure sensor. The measurement results obtained are therefore particularly precise.

Furthermore, the force sensor may be designed for measuring the deformation of the spring and/or for measuring the spring deflection. In this disclosed embodiment, the force acting on the at least one rolling body/the at least one sliding surface is determined circuitously by measuring the deformation. Under some circumstances, such an arrangement can be resolved in a structurally simpler manner than the direct measurement of the force mentioned. For example, the force sensor can be designed as a Hall sensor which measures the mentioned deformation of the spring and/or the spring deflection mentioned. In principle, the use of such a Hall sensor can also be independent of a footboard which is mounted with more than three support regions/sliding regions.

The stop may be effective over the principle loading of the at least one rolling body/of the at least one sliding surface. It is thereby avoided that the at least one rolling body/the at least one sliding surface incurs damage under high loading, since a force over the permissible loading of the at least one rolling body/of the at least one sliding surface is absorbed by the stop.

Furthermore, the stop may be effective over the measurement range of the force sensor. As a result, good use can be made of the measurement range of the force sensor. To avoid damage to the force sensor, a force going therebeyond is absorbed by the stop.

Furthermore, the stop may be ineffective when the footboard is not loaded. Easy retraction and extension of the footboard is thereby made possible since essentially only rolling friction occurs in the guide of the footboard, but a frictional force caused by the stop is avoided.

Further embodiments of the entry aid are provided if the stop is effective at a force which goes more than 100 N beyond the weight of the footboard, acts on the footboard and is directed in the same direction as the weight. There is thereby a certain safety reserve, and therefore, because of tolerances and ageing or settling, the stop is effective even when the footboard is not loaded and is therefore always effective. The stop may be effective at a force which goes more than 700 N beyond the rate of the footboard, acts on the footboard and is directed in the same direction as the weight. As a result, the most frequent loading situation of an average person with a body weight of 70 kg is still supported by the rolling bodies/sliding surfaces, or an average adult and also lighter individuals and objects can be reliably detected on the footboard with the aid of the force measuring sensors.

The stop, on or with a bearing surface, may have a coefficient of static friction of $\mu>0.5$ or a releasable form-fitting connection is provided therebetween. As a result, the movement of the step under (excessive) loading may be obstructed or may even be prevented. For example, hazardous situations can thereby be averted. If driving force of the drive, spring constant and spring deflection are suitably co-ordinated until the stop and coefficient of friction become effective, it is possible, for example, for a movement of the step which is loaded by a person to be prevented solely by the fact that the drive for this is too weak. Even in the event of failure of a possibly present person detection which controls the drive, the footboard then does not move. The latter moves only if it is unloaded or is only weakly loaded. The same applies if a releasable form-fitting connection is provided between the stop and the bearing surface thereof in the rail, for example by the stop and the rail being provided with a toothing. The height of the toothing may be selected here in such a manner that the toothing is released by the spring when the loading drops below a certain threshold value.

Finally, the stop, on or with a bearing surface, may have a coefficient of static friction of $\mu<0.5$ (optionally $\mu<0.2$). As a result, the movement of the step during loading may be promoted. For example, when driving force of the drive, spring constant and spring deflection are suitably co-ordinated until the stop and coefficient of friction become effective, the step is retracted even if the latter is loaded. The means of transport itself can thereby continue its journey even if the footboard is loaded, for example, by an item of luggage which has been forgotten.

It should be stated at the onset that identical parts are provided with the same reference numbers or same component designations in the variously described embodiments, wherein the disclosures contained throughout the description can be transferred analogously to identical parts with the same reference numbers or identical component designations. The position detail selected in the description, such as, for example, at the top, at the bottom, laterally, etc. also relate to the immediately described and illustrated figure and, in the event of a change in position, can be transferred analogously to the new position. Furthermore, individual features or combinations of features from the various exemplary embodiments shown and described can constitute solutions which are independent and inventive per se.

All of the details regarding value ranges in the objective description should be understood to the effect that the details comprise any and all subdomains thereof, for example the detail 1 to 10 should be understood as meaning that all subdomains starting from the lower limit 1 and the upper limit 10 are also covered, that is to say, all subdomains begin with a lower limit of 1 or more and end at an upper limit of 10 or less, for example 1 to 1.7, or 3.2 to 8.1 or 5.5 to 10.

Figure 1:
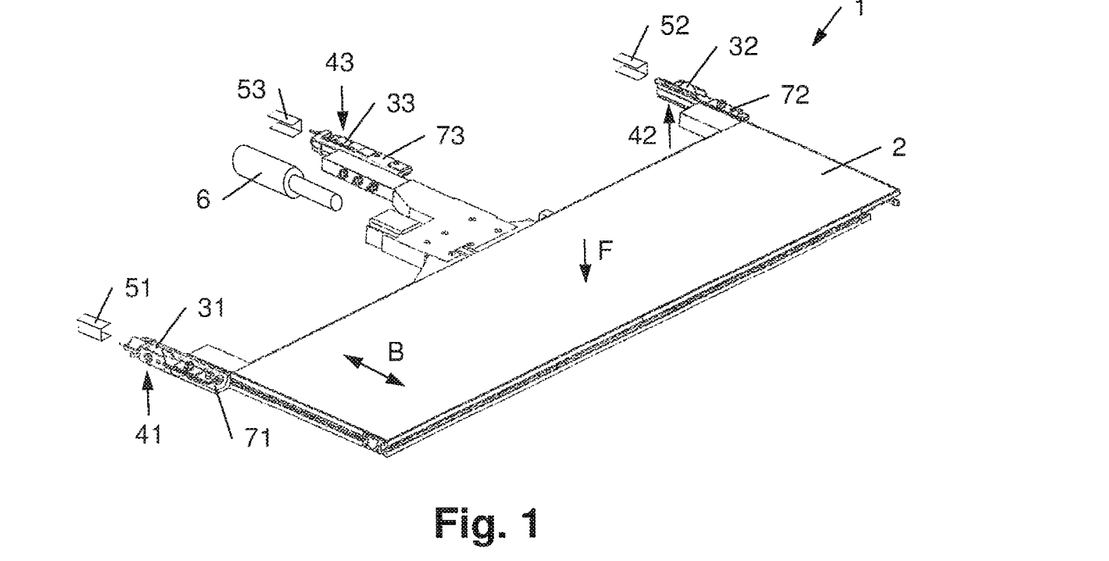
FIG. 1 shows a schematically illustrated entry aid.

FIG. 1 shows an entry aid 1 for a rail vehicle or a motor vehicle, comprising a footboard 2 which is mounted displaceably on rolling bodies 31 . . . 33. In this exemplary embodiment, the rolling bodies 31 . . . 33 are positioned in support regions 41 . . . 43 which are spaced apart from each other, and run in rails 51 . . . 53 which are indicated. Furthermore, the entry aid 1 comprises a drive 6 which is coupled to the footboard 2 and which is merely illustrated schematically in FIG. 1 and which is designed for extending and retracting the footboard 2. In the example illustrated in FIG. 1, the rolling bodies 31 . . . 33 are arranged in special sliding elements 71 . . . 73.

Figure 2:
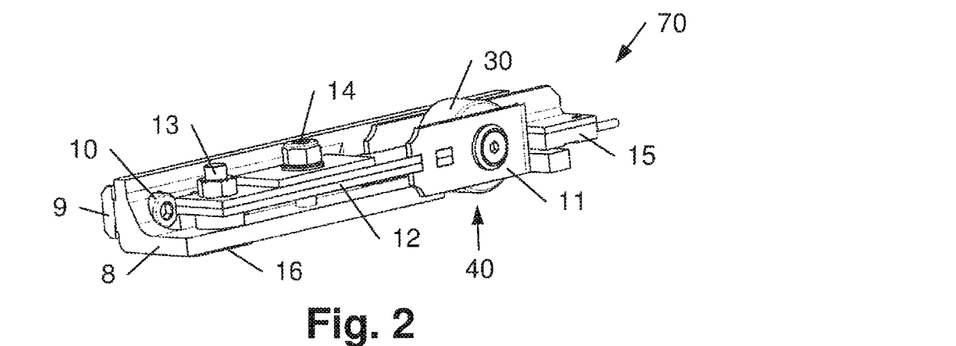
FIG. 2 shows a sliding element used in the in FIG. 1 in an oblique view.
Figure 3:
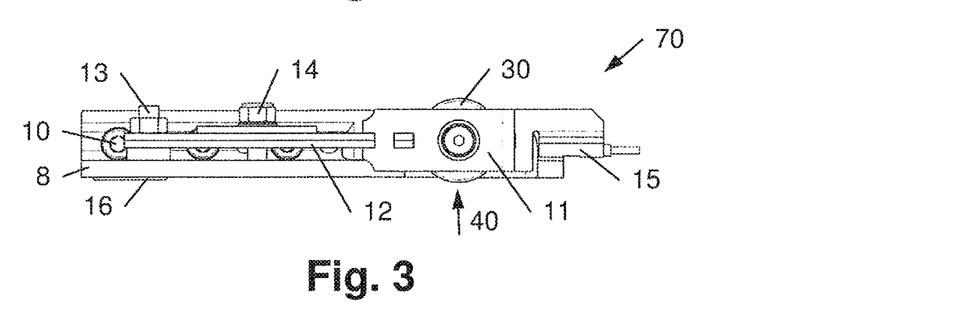
FIG. 3 shows the sliding element from FIG. 2 in side view.

FIGS. 2 and 3 now show such a sliding element 70 in detail. Specifically, FIG. 2 shows the sliding element 70 in an oblique view, and FIG. 3 shows same in a side view. The sliding element 70 comprises a basic body 8 to which sliding blocks 9 are fastened with screws 10. The sliding elements 70 can be fastened to the footboard 2 by the sliding blocks 9 and screws 10. The roller 30 is arranged in a roller holder 11 which is mounted on the basic body 8 via a spring assembly 12 and a screw 13. Furthermore, the sliding element 70 comprises an adjustment screw 14, an optional force measuring sensor 15 and an optional stop 16. In this exemplary embodiment, the sliding element 70 or the entry aid 1 therefore comprises a rolling body 30 or a support region 40, which is mounted resiliently with the aid of a spring 12, and a stop 16 which is effective after a predeterminable spring deflection of the spring 12 on the far side of the at least one rolling body 30 and of the spring 12.

The entry aid 1 then functions as follows:

In the basic position, the rolling body 30, which is designed here as a roller, projects beyond the lower side of the basic body 8 and of the stop 16. In the basic position, the sliding element 70 and therefore the footboard 2 rests on the rolling bodies 30 . . . 33 and can be moved slowly by overcoming the rolling friction.

By means of the spring 12, the loading of the rolling body 30 is limited to that force which is defined by the spring constant of the spring 12 and the spring deflection, at which the stop 16 becomes effective. By contrast, a loading of the rolling body 30 going therebeyond is avoided since, as the loading increases, the roller 30 is pressed upward, as seen in FIGS. 2 and 3, and, as a consequence of the stop 16, comes to lie on the running surface arranged in the rail 51 . . . 53. A further loading is absorbed in consequence by the stop 16.

However, from this time, the loading of the roller 30 is constant. It is advantageous in this connection if the stop 16 is effective over the permissible loading of the rolling body 30 to protect the rolling body 30 from damage. The force from which the stop 16 becomes effective can be adjusted with the adjustment screw 14.

With the force sensor 15 which, in this exemplary embodiment, is designed for measuring the spring deflection of the spring 12, the bearing force acting on the roller 30 can be measured. Alternatively, the force sensor 15 can also be designed for measuring the deformation of the spring 12 and can be realized, for example, with the aid of screen gauges. However, the direct measurement of the bearing force mentioned is also possible in principle. For example, for this purpose, a force sensor 15 designed as a piezo pressure sensor can be arranged in the region of the mounting of the roller 30 in the roller holder 11. When a force sensor 15 is used, it is of advantage if the stop 16 is effective over the measurement range of the force sensor 15 because the measurement range of the force sensor 15 can thereby be readily used without having to risk damage to same because of excessive loading. A force going beyond the measurement range is then absorbed by the stop 16.

The loading acting on the footboard 2 can be determined with the aid of the force sensor 15. For example, with the data obtained in this manner, conclusions can be drawn as to who or what precisely is located on the footboard 2. If the magnitude of the force F is, for example above 500N, it can be assumed with a high degree of probability that an adult is located on the footboard 2. If the loading is variable, a moving organism (human or animal) is in all probability located on the footboard 2, and if the loading is static for a prolonged period, it is also possible with a certain degree of probability merely that an item of luggage is deposited on the footboard 2.

In general, a plurality of possibilities are available for the arrangement of the force sensor 15 or a plurality of force sensors 15. For example, all of the sliding elements 71 . . . 73 in FIG. 1 can be equipped with force sensors 15, and therefore the bearing forces acting in all three support regions 41 . . . 43 can be measured. The magnitude of the force F acting on the footboard 2 and the engagement point of the force on the footboard 2 can thereby firstly be calculated.

It is also conceivable for the entry aid 1 to comprise merely two force sensors 15 which are designed for measuring the bearing forces acting in two support regions 41 . . . 43. It is particularly advantageous if the first and the second sliding element 71 and 72 are equipped with force sensors 15 and therefore the bearing forces acting in the first support region 41 and in the second support region 42 can be measured. In this manner, the magnitude of the force F acting on the footboard 2 and the engagement point of the force on the footboard 2 can thereby be firstly calculated if a co-ordinate of the engagement point is presumed or assumed to be known. For example, the engagement point mentioned can be assumed in a good approximation with respect to the depth of the footboard 2 in the center of the depth.

However, it is also conceivable that the entry aid 1 comprises only one force sensor 15. The magnitude of the force F acting on the footboard 2 can thereby be calculated if the engagement point of the force is presumed or assumed to be known. For example, the engagement point mentioned can be assumed in a good approximation in the center of the footboard 2. If the force sensor 15 is provided in the third sliding element 73 such that the bearing force acting in the third support region 43 can be measured, knowledge of the co-ordinate of the engagement point of the force F in the direction of movement B of the footboard 2 is sufficient. For example, the engagement point mentioned can be assumed in a good approximation with respect to the depth of the footboard 2 in the center of the latter. Of course, it is also possible to assume other engagement points with respect to the depth of the footboard 2, for example the front edge or else rear edge thereof.

In this example, the rolling bodies 31 . . . 33 are positioned in precisely three support regions 41 . . . 43 which are spaced apart from one another and are arranged in a triangle. As a result, the mounting of the footboard 2 is statically determined. The on the rolling bodies 31 . . . 33 are therefore readily foreseeable since lifting of the rolling bodies 31 . . . 33 or of the stop 16, as may occur in the case of a guide which has more than three support regions 31 . . . 33, is impossible. In addition, the risk of the sliding elements 71 . . . 73 tilting in the rails 51 . . . 53 is significantly reduced.

In the example illustrated in FIG. 1, precisely one rolling body 31 . . . 33 is provided per support region 41 . . . 43, that is to say, the number of the rolling bodies 31 . . . 33 is precisely three. However, it is also possible for a support region 41 . . . 43 to have more than one rolling body 31 . . . 33. For example, rollers 31 . . . 33 arranged next to one another or one behind another can be provided. It is advantageous here if the distance of two support regions 41 . . . 43 from each other is at least five times the size of the maximum extension thereof. As a result, the mounting of the footboard 2 is then also determined substantially statically.

When a plurality of rolling bodies 30 . . . 33 are used per support region 40 . . . 43, it is furthermore of advantage if the rolling bodies 30 . . . 33 provided in a support region 40 . . . 43 are mounted movably with respect to one another, in particular resiliently, with respect to a direction transversely with respect to the bearing surface thereof. In this manner, tolerances of the entry aid can be compensated for in the respect that all of the rolling bodies 30 . . . 33 of a support region 40 . . . 43 are in contact with a bearing surface or rolling surface and do not "hang in the air". It is thereby avoided that the force acting in a support region 40 . . . 43 is not inadvertently absorbed only by a part of the rolling bodies 30 . . . 33 located in the rolling region 40 . . . 43 and therefore the rolling bodies are excessively loaded.

Of course, the rolling bodies 30 . . . 33 provided in a support region 40 . . . 43 can be mounted rigidly with respect to one another with respect to a direction transversally with respect to the bearing surface thereof, thus resulting in a simple and less error-prone construction of the entry aid 1.

In the example illustrated in FIG. 1, all of the support regions 41 . . . 43 are spaced apart from one another with respect to a direction transversally with respect to a direction of movement of the footboard 2 (also see the double arrow B in FIG. 1). Each support region 41 . . . 43 is therefore assigned a dedicated running surface or rail 51 . . . 53. In this variant, the security against tilting is therefore particularly great. In addition, in FIG. 1, the rails 51 and 53 and also 52 and 53 are identically spaced apart. However, this is in no way compulsory, and the rails 51 and 53 and also 52 and 53 could also be spaced apart differently.

Furthermore, the first and the second support region 41, 42 lie closer to the footboard 2 than the third support region 43, as seen in a direction of movement of the footboard 2, wherein the first and the second support region 41, 42 are at an equal distance from the footboard 2, as seen in a direction of movement of the footboard 2. This results in substantially symmetrical ratios. With the prerequisite that the third support region 43 is at an equal distance with regard to the direction of movement of the footboard 2 from the first/second support region 41, 42 as the engagement point of the force F, forces of identical magnitude which correspond to the loading F on the footboard 2 act in the first to third support regions 41 . . . 43. In the first and second support regions 41, 42, the forces mentioned act upward, whereas the force in the third support region 43 acts downward. As a result, use can be made of three identical rolling bodies 31 . . . 33 which, owing to the symmetrical loading thereof, also have substantially the same surface life. Of course, the symmetry is not compulsory for the entry aid 1. Deviating geometrical ratios are, of course, possible without limitation.

In the example shown, the support regions 40 . . . 43 or the rolling bodies 30 . . . 33 are mounted movably, here even resiliently, with respect to one another with respect to a direction transversally with respect to the bearing surface thereof. In principle, however, it is also conceivable for the support regions 40 . . . 43 or the rolling bodies 30 . . . 33 to be mounted rigidly with respect to one another with respect to a direction transversally with respect to the bearing surface thereof. This results in a simple and less error-prone construction of the entry aid 1.

In general, the rolling body 30 . . . 33 can also have a different form than a roller. For example, the rolling bodies can be designed with a ball, needle and/or barrel. Rollers and barrels, for example, can absorb comparatively high forces. Furthermore, a barrel mounting can readily compensate for angle errors. Angle errors are also readily compensated for if balls are used as the rolling bodies. Balls are also especially suitable if the running surface is not configured horizontally, but rather is placed somewhat obliquely to improve the lateral guidance of the footboard 2. The resulting bearing force is then not oriented vertically, but rather just obliquely. Needles are finally suitable in particular for installation situations in which a low overall height is important. A different number of rolling bodies or rolling bodies which differ in type can then optionally also be used in the individual support regions.

As mentioned, in the examples illustrated in the figures, the stop 16 is ineffective when the footboard 2 is not loaded. As a result, easy retraction and extension of the footboard 2 is made possible since essentially only rolling friction occurs between the rollers 30 . . . 33 and the rails 51 . . . 53, but a frictional force caused by the stop 16 is avoided.

It is of advantage if the stop 16 is effective at a force going more than 100 N beyond the weight of the footboard 2, acts on the footboard 2 and is directed in the same direction as the weight. This results in a certain safety reserve, and therefore, because of tolerances and ageing or settling, the stop 16 is not already effective when the footboard 2 is unloaded and is therefore always effective. The stop 16 may be effective at a force going more than 700 N beyond the rate of the footboard 2. As a result, the most frequent loading situation of an average person of a bodyweight of 70 kg is also supported by the rolling bodies 30 . . . 33, or an adult average person and also lighter persons and objects on the footboard 2 can be reliably detected with the aid of the force measuring sensors 15.

For example, a coefficient of static friction of $\mu>0.5$ or a releasable form-fitting connection can be provided between the stop 16 and the bearing surface thereof in the rail 51 . . . 53. As a result, the movement of the footboard 2 can be if anything inhibited or even prevented under (excessive) loading. For example, hazardous situations can thereby be averted. When driving force of the drive 6, spring constant and spring deflection until the stop 16 and coefficient of friction become effective are suitably coordinated, it is possible, for example, for a movement of the footboard 2, which is loaded by a person, to be prevented solely by the fact that the drive is too weak for this purpose. Even in the event of a failure of a possibly present person detection which controls the drive 6, the footboard 2 does not move unless it is unloaded or weakly loaded. The same applies if a releasable form-fitting connection is provided between the stop 16 and the bearing surface thereof in the rail 51 . . . 53, for example by the stop 16 and the rail 51 . . . 53 being provided with a toothing. The height of the toothing may be selected here in such a manner that the toothing is released by the spring 12 when the loading drops below a certain threshold value. Of course, the footboard 2 can also be locked differently, for example by means of a latching bolt which prevents the displacement element 70 . . . 53 from being displaced in the rail 51 . . . 53.

However, it is also possible, for example, for a coefficient of static friction of $\mu<0.5$ (optionally $\mu<0.2$) to be provided between the stop 16 and the bearing surface thereof in the rail 51 . . . 53. As a result, the movement of the footboard 2 under loading is if anything promoted. For example, when driving force of the drive 6, spring constant and spring deflection until the stop 16 and coefficient of friction become effective are suitably co-ordinated, the footboard 2 can be retracted even when the footboard is loaded.

Figure 4:
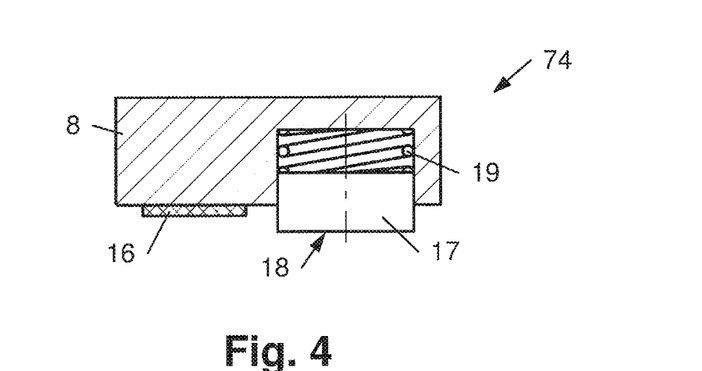
FIG. 4 shows a sliding element with a resiliently mounted sliding body.

FIG. 4 shows an exemplary embodiment of a sliding element 74 in which a resiliently mounted sliding body 17 with a sliding surface 18 is arranged in a basic body 8. If the force acting on the sliding surface 18 increases, the sliding body 17 is pressed noticeably into the basic body 8 counter to the force of the spiral spring 19 until the sliding body 17 projects from the basic body 8 to the same distance as the stop 16. From this point, any further loading—similarly as in the case of the sliding element 70 . . . 73 illustrated in FIGS. 1 to 3—is taken over by the stop 16.

Figure 5:
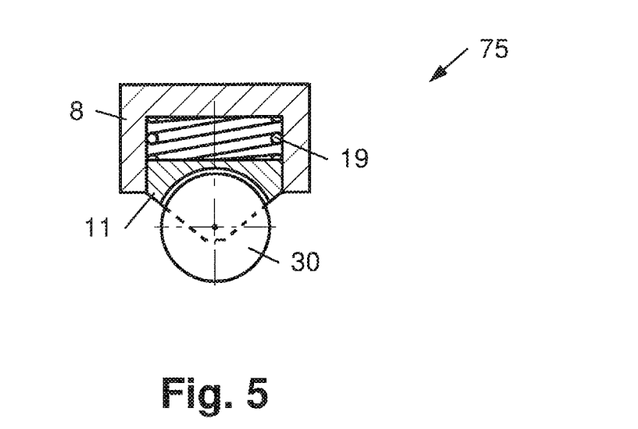
FIG. 5 shows a sliding element with a resiliently mounted and linearly displaceable roller.

FIG. 5 shows an exemplary embodiment of a sliding element 75 in which a resiliently mounted roller holder 11 with a roller 30 is arranged in a basic body 8. As a result, the support regions 40 . . . 43 can be designed to be movable with respect to one another with respect to a direction transversally with respect to the bearing surface thereof. Furthermore, in addition or alternatively thereto, it can be provided that the rolling bodies 30 . . . 33 provided in a support region 40 . . . 43 are movable with respect to one another with respect to a direction transversally with respect to the bearing surface thereof. In contrast to the variant which is illustrated in FIGS. 2 and 3 and in which the roller 30 is moved on an arcuate path, the roller 30 in the variant illustrated in FIG. 5 is mounted in a linearly displaceable manner. Of course, the variant embodiment illustrated in FIG. 5 can also be equipped with a stop 16.

The teaching disclosed with respect to FIGS. 1 to 3 can also be transferred analogously to the disclosed embodiments illustrated in FIG. 4 or 5, in particular also with respect to the use of force sensors and the provision of certain frictional values or a releasable form-fitting connection for the stop 16. It is specifically of advantage if the coefficient of friction between the sliding surface 18 and the bearing surface thereof in the rail 51 . . . 53 is smaller than the coefficient of friction between the stops 16 and the bearing surface thereof in the rail 51 . . . 53 if the stop 16 does not at all form a releasable form-fitting connection with the rail 51 . . . 53.

Figure 6:
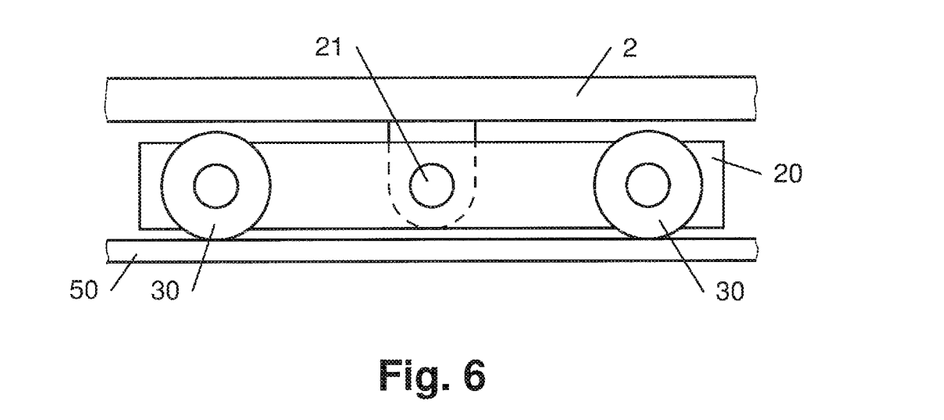
FIG. 6 shows an arrangement in which two rolling bodies are arranged on a rocker.

FIG. 6 shows an arrangement in which two rolling bodies 30 are arranged on a rocker 20. As a result, firstly, a loading can be distributed over a plurality of rolling bodies 30, but secondly it can also be ensured that the rolling bodies 30 always provide support. Essentially only a bearing force, but no torque can be transmitted via the rotary bearing or the bearing point 21 of the rocker 20. In a similar manner as is illustrated in FIG. 1 for the rolling bodies 31 . . . 33, the bearing points 21 of the rockers 20 are positioned here in precisely three support regions 40 . . . 43 which are spaced apart from one another and are arranged in a triangle. The mounting of the footboard 2 here is itself still substantially determined statically even if the rolling bodies 30 do not form a cluster, but the force introduction points or bearing points 21 mentioned have this property. The exemplary embodiment illustrated in FIG. 6 is illustrated in conjunction with rolling bodies 30; of course, the rocker 20 shown can also be used in conjunction with sliding bodies 18.

Figure 7:
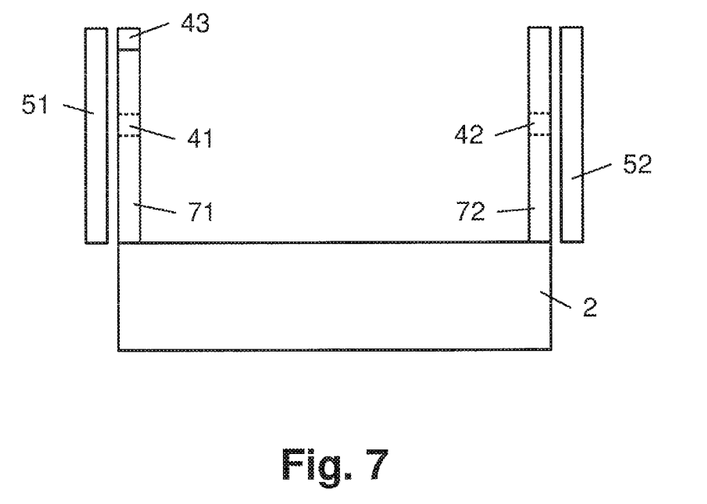
FIG. 7 shows a schematically illustrated arrangement in which the support regions are mounted in merely two rails.

FIG. 7 shows a schematically illustrated and exemplary arrangement in a top view, in which the support regions 41 . . . 43 are mounted in merely two rails 51, 52. The support regions 41 and 43 are arranged here in the left sliding element 71, which is mounted in the left rail 51, and the support region 42 is arranged in the right sliding element 72 which is mounted in the right rail 52. (It is noted at this juncture that, for the sake of better illustration, the rails 51 and 52 are displaced laterally and are shown next to the support regions 41 . . . 43. In reality, the support regions 41 . . . 43 are, of course, guided in the rails 51 and 52.) The support regions 41 and 42 are arranged on the lower side, and the support region 43 on the upper side, of the sliding elements 71, 72.

Figure 8:
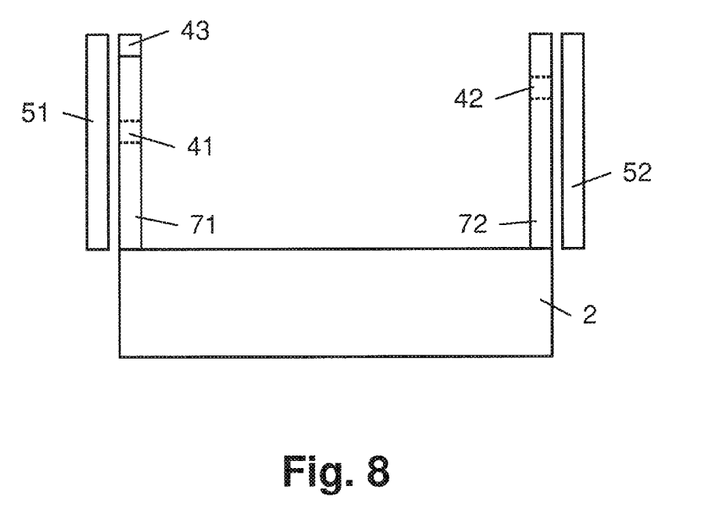
FIG. 8 shows a similar situation to FIG. 7, only with a somewhat different arrangement of the support region.

FIG. 8 shows an arrangement which is very similar to the arrangement illustrated in FIG. 7. However, in contrast thereto, the support region 42 is offset somewhat to the rear and is located in the center of the two support regions 41 and 43 with respect to the sliding direction.

Figure 9:
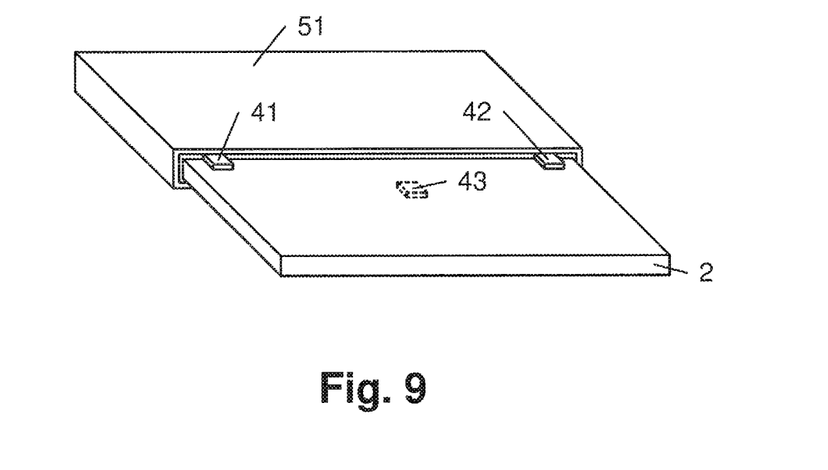
FIG. 9 shows a schematically illustrated arrangement in which the support regions are mounted in merely one rail.

FIG. 9 shows a schematically illustrated and exemplary arrangement in a top view, in which the support regions 41 . . . 43 are mounted in merely one rail 51. The support regions 41 . . . 43 are arranged here, by way of example, directly on the footboard 2 which is designed to be deeper than would be required by the actual step surface. The lower part of the footboard 2 with the support regions 41 . . . 43 is guided here in the rail 51, which is of box-shaped design. FIG. 9 illustrates the footboard 2 in a manner completely extended from the rail 51, for the sake of better illustration. In reality, the footboard is, by contrast, extended at maximum as far as the support region 43. The footboard 2 itself can be produced, for example, in a sandwich construction, and therefore adequate stability at a low weight can be obtained.

In FIG. 9, the footboard 2 is guided within the rail 51. Of course, it is also conceivable that the rail 51 is guided within the footboard 2. Accordingly, in FIG. 9, the rail 51 can also be used as a footboard 2, and vice versa. In particular, for this purpose, the support regions 41 . . . 43 can be arranged on the inner side of the rail 51, which has become the footboard 2. This also applies to the other variants illustrated in which the support regions 41 . . . 43 can likewise be mounted on the car.

Figure 10:
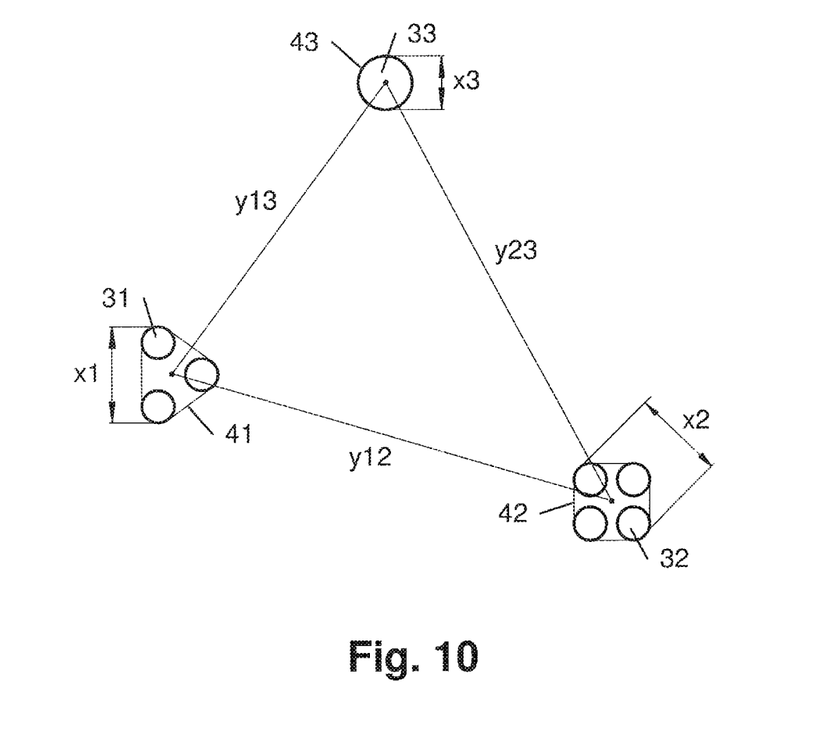
FIG. 10 shows an exemplary arrangement of different support regions to explain a "cluster."

FIG. 10 finally shows a purely exemplary arrangement of various support regions 41 . . . 43 in a triangle, wherein the support region 41 has three rolling bodies 31 arranged in a triangle and the support region 42 has four rolling bodies 32 arranged in a square. A single, somewhat larger rolling body 43 is arranged in the support region 33. The support region 33 is therefore congruent with the rolling bodies 33.

The greatest extension of the support region 41 is determined by the side length x1 of the triangle, and that of the support region 42 by the diagonal x2 and that of the support region 43 by the diameter x3. In this example, the support region 41 has the greatest extension, that is to say x1>x2,x3. The distances y12, y13 and y23 between the support regions 41 . . . 43 are advantageously at least five times the size of the maximum extension thereof. In the specific example, this means $y12, y13, y23 \geq 5 \cdot x1$.

In this example, all of the distances y12, y13 and y23 are greater than 5·x1. Although this is particularly advantageous, it is also possible for the distances y12, y13 and y23 advantageously to be at least five times the size in each case as the maximum extension of the adjacent support regions 41 . . . 43. This means specifically $y12 \geq 5 \cdot MAX(x1,x2)$, $y13 \geq 5 \cdot MAX(x1,x3)$ and $y23 \geq 5 \cdot MAX(x2,x3)$.

In FIG. 10, the distances y12, y13 and y23 are related to the (area) centers of gravity of the support regions 41 . . . 43. However, it is also conceivable, for example, for the distance between two support regions 41 . . . 43 to be determined by the diameter of that smallest circle which still precisely fits between two support regions 41 . . . 43.

If the above conditions are met, the arrangement is determined particularly readily statically and the jamming tendency is only small. The rolling bodies 31 . . . 33 are incorporated here into clearly delimited "clusters". In addition, the disclosed teaching is equally applicable to the bearing points 21 of rockers 20.

The exemplary embodiments show possible variant embodiments of an entry aid 1 or of a sliding element 70 . . . 75, wherein it should be mentioned at this juncture that the embodiments are not restricted to the specifically illustrated variant embodiments thereof; rather, diverse combinations of the individual variant embodiments are also possible, and this variation option, on account of the teaching relating to technical practice provided, falls within the area of expertise of a person skilled in this technical field. The scope of protection therefore also covers all conceivable variant embodiments which are made possible by combining individual details of the variant embodiments illustrated and described.

In particular, it is stated that the entry aid 1 illustrated or the sliding elements 70 . . . 75 illustrated may in reality also comprise more or fewer constituent parts than illustrated. Specifically, differently than illustrated in the figures, the footboard 2 may also be mounted on fixed (i.e. not resiliently mounted) rolling bodies 30 . . . 33 and/or sliding surfaces 18. In this case, a stop 16 can be dispensed with. Furthermore, mixed forms of the embodiments illustrated are conceivable. For example, a rolling body 30 . . . 33 and a sliding body 17 can be used in mixed form for the mounting of a footboard 2. The same applies to rockers 20. Furthermore, resiliently mounted rolling bodies 30 . . . 33 or sliding bodies 17 with fixedly mounted rolling bodies 30 . . . 33 or sliding bodies 17 can also be used together.

As a matter of form, it should be pointed out, in conclusion, that the entry aid 1 and the sliding elements 70 . . . 75 and the constituent parts thereof have in some cases not been illustrated to scale and/or have been illustrated on an enlarged and/or reduced scale to give a better understanding of the construction thereof.

Disclosed embodiments relate to an entry aid for a rail vehicle or a motor vehicle, comprising a footboard which is mounted displaceably on rolling bodies and/or sliding surfaces, and a drive which is coupled to the footboard and is designed for extending and retracting the footboard.

Such an entry aid is basically known from the prior art. For example, such entry aids are used in (public) passenger conveying vehicles to facilitate the entry into and the exit from the vehicle or to avoid putting individuals at risk. For example, the footboard of a rail vehicle serves for spanning the gap between the rail vehicle and a platform and the rail vehicle stops at a station. Passengers are thus prevented from slipping into the gap concerned and being injured. Analogously, the footboard can serve in buses to cover the gap between vehicle and curb edge. However, the footboard can in general also serve, for example, to span the height difference between the interior of the vehicle and the platform or pavement to facilitate the entry and exit with wheelchairs and buggies. For this purpose, some buses can also be inclined to the side, as a result of which the footboard is likewise placed obliquely downward.

As a rule, the footboard, which can be moved between an inoperative position and a use position with the aid of a drive, is guided on two rails arranged parallel to each other. Customarily, two rulers which are spaced apart from each other in the sliding direction are provided per rail, and therefore tilting of the footboard is prevented.

This system has a number of disadvantages. For example, the footboard can easily tilt, in particular if it is loaded asymmetrically. Furthermore, the rolling bodies/sliding surfaces or the running surface of the rail may be damaged in the event of excessive loading.

Disclosed embodiments provide an improved entry aid for a rail vehicle or a motor vehicle. In particular, the above-mentioned disadvantages are intended to be avoided or at least mitigated.

Disclosed embodiments provide an entry aid of the type mentioned at the beginning, in which the rolling bodies and/or sliding surfaces
a) are positioned in precisely three support regions which are spaced apart from one another and are arranged in a triangle, or
b) are arranged on a plurality of rockers, and bearing points of the rockers are positioned in precisely three support regions which are spaced apart from one another and are arranged in a triangle.

As a result, the mounting of the footboard is substantially determined statically. Therefore, unlike in the case of a plurality of support regions, as arise, for example, by means of the four rollers spaced apart from one another in the prior art, the forces on the support regions are therefore more easily foreseeable. An inadvertent lifting of a support region from the bearing rolling surface thereof, which, according to the prior art, leads to an unplanned excessive loading of the remaining support regions, is prevented in the procedure presented. Furthermore, it is thereby ensured that the support regions are exposed mainly to an advantageous pulsating loading, but not to a disadvantageous alternating loading, as is possible, for example, in the case of a footboard having four rollers. Owing to the prevention of lifting of a support region, damage which may result due to a support region striking on the bearing or rolling surface thereof is also avoided. In particular, hardened surfaces may otherwise be destroyed even in the event of a loading which is relatively small per se or even after just a short time.

Furthermore, the risk of the guide of the footboard tilting is significantly reduced. The force required for secure retraction and extension of the footboard can therefore also be planned better. Unplanned stops due to a jammed footboard and work on the repair thereof can thus be avoided.

LIST OF REFERENCE SIGNS

1 Entry aid
2 Footboard
30 ... 33 Rolling body (roller)
40 ... 43 Support region
50 ... 53 Rail
6 Drive
71 ... 75 Sliding element
8 Basic body
9 Sliding block
10 Fastening screw
11 Roller holder
12 Spring assembly
13 Screw
14 Adjustment screw
15 Force measuring sensor
16 Stop
17 Sliding body
18 Sliding surface
19 Spiral spring
20 Rocker
21 Rocker bearing point
B Direction of movement
F Force
$x1 ... x3$ Support region extension
$y12 ... y23$ Distance between support regions

The invention claimed is:

1. An entry aid for a rail vehicle or a motor vehicle, the entry aid comprising,
a footboard mounted displaceably on rolling bodies and/or sliding surfaces;
each rolling body and/or sliding surface mounted resiliently with a spring; and
a drive coupled to the footboard which extends and retracts the footboard,
wherein the rolling bodies and/or sliding surfaces are:
positioned in precisely three support regions spaced apart from one another and arranged in a triangle, or
arranged on a plurality of rockers, and bearing points of the rockers are positioned in precisely three support regions spaced apart from one another and arranged in a triangle;
wherein each spring limits the loading of the rolling body and/or sliding surface in a direction perpendicular to extension of the footboard to a force defined by a spring constant and spring deflection of the spring.

2. The entry aid of claim 1, wherein each support region has a length which corresponds to the greatest possible distance between two points arranged on an edge of the support region, and
the distance of two support regions from each other is at least five times as large as the value of the greatest length.

3. The entry aid of claim 1, wherein precisely one rolling body or one sliding surface or one bearing point is provided per support region.

4. The entry aid of claim 1, wherein all of the support regions are spaced apart from one another with respect to a direction transversally with respect to a direction of movement of the footboard.

5. The entry aid of claim 1, wherein the footboard has a front edge oriented transversely with respect to the direction of movement of the footboard and a rear edge which is oriented transversely with respect to the direction of movement of the footboard and lies closer to the drive than the front edge,
a first and a second support region lie closer to the front edge of the footboard than the third support region, as seen in a direction of movement of the footboard, and the first and the second support region are at an equal distance from the front edge of the footboard, as seen in a direction of movement of the footboard.

6. The entry aid of claim 1, further comprising a force sensor which measures the bearing force acting in a support region.

7. The entry aid of claim 6, further comprising three force sensors which measure the bearing forces acting in all three support regions.

8. The entry aid of claim 6, further comprising two force sensors which measure the bearing forces acting in two support regions.

9. The entry aid of claim 6, further comprising precisely one force sensor which measures the bearing force acting in precisely one support region.

10. The entry aid of claim 1, wherein the support regions are movable with respect to one another with respect to a direction transversally with respect to a bearing surface thereof.

11. The entry aid of claim 1, further comprising a stop attached to the spring of each rolling body and/or sliding surface that moves in a direction perpendicular to the platform extension.

* * * * *